United States Patent [19]
Kobayashi

[11] Patent Number: 6,077,185
[45] Date of Patent: Jun. 20, 2000

[54] TOROIDAL TYPE CONTINUOUSLY VARIABLE TRANSMISSION

[75] Inventor: Katsuya Kobayashi, Tokyo, Japan

[73] Assignee: Nissan Motor Co., Ltd., Yokohama, Japan

[21] Appl. No.: 08/950,199

[22] Filed: Oct. 14, 1997

[30] Foreign Application Priority Data

Oct. 14, 1996 [JP] Japan .................................. 8-270745

[51] Int. Cl.⁷ .................................................. F16H 61/30
[52] U.S. Cl. ............................................................ 476/10
[58] Field of Search .............................. 476/10; 60/413, 60/416, 469; 92/143; 91/447, 468; 192/109 F

[56] References Cited

U.S. PATENT DOCUMENTS

| | | | |
|---|---|---|---|
| 3,001,367 | 9/1961 | Bartholomew | 60/467 |
| 3,870,077 | 3/1975 | Nakamura | 137/614.11 |
| 4,662,248 | 5/1987 | Greenwood | 74/867 |
| 5,542,890 | 8/1996 | Nakano et al. | |
| 5,575,732 | 11/1996 | Inoue | 476/10 |
| 5,697,216 | 12/1997 | Phillips | 60/469 |

FOREIGN PATENT DOCUMENTS

| | | |
|---|---|---|
| 0 006 690 | 1/1982 | European Pat. Off. . |
| 0 078 125 | 7/1985 | European Pat. Off. . |
| 44 02 523 | 8/1995 | Germany . |
| 62-283248 | 12/1987 | Japan . |
| 2-283949 | 11/1990 | Japan . |
| 2 107 009 | 4/1983 | United Kingdom . |

OTHER PUBLICATIONS

Nakano et al., "Dynamic Characteristics of Speed Ratio Control of the Halt Toroidal CVT for Passenger Cars" *SAE Technical Paper Series* pp. 24–32 (1990).

*Primary Examiner*—David A. Bucci
*Assistant Examiner*—Brandon C. Stallman
*Attorney, Agent, or Firm*—Foley & Lardner

[57] ABSTRACT

This invention relates to a toroidal type continuously variable transmission in which a plurality of power rollers are squeezed between an input cone disk and an output cone disk which are arranged upon the same axis of rotation. The gyration angles of the power rollers, in other words the speed change ratio, are changed by pistons driving the power rollers in directions perpendicular to the axis of rotation in response to hydraulic pressure. Hydraulic pressure is supplied from a speed change control valve via hydraulic fluid conduits. By providing, for example, orifices in hydraulic fluid conduits so as to exert resistance against movement of the pistons due to external disturbance, the influence exerted by displacement of a particular one of the power rollers due to external disturbance upon the other ones of the power rollers is minimized, and thus the spoiling of the synchronization of the power rollers by vibration is prevented.

9 Claims, 19 Drawing Sheets

FIG. 1

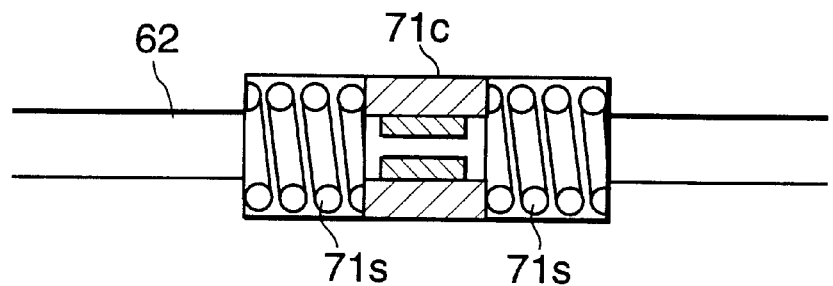
FIG. 21
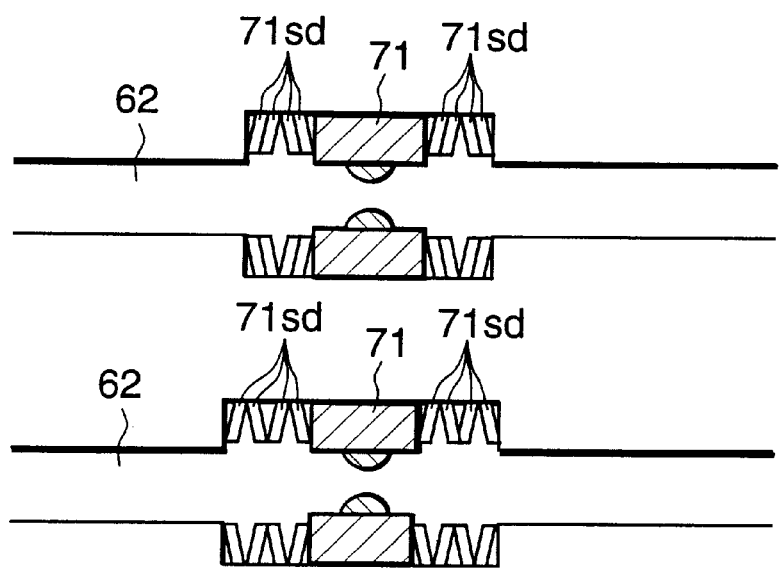
FIG. 22A
FIG. 22B

TOROIDAL TYPE CONTINUOUSLY VARIABLE TRANSMISSION

FIELD OF THE INVENTION

This invention relates to preventing the generation of vibration in a toroidal type continuously variable transmission.

BACKGROUND OF THE INVENTION

In a toroidal type continuously variable transmission for a vehicle, such as the one disclosed in U.S. Pat. No. 5,542,890, the speed change ratio is changed by varying the gyration angle of a plurality of power rollers which are squeezed between an input disk and an output disk. Each of these power rollers is supported by a trunnion.

The gyration angles of the power rollers are changed by applying power to the trunnions in a specific direction which lie at right angles to the rotational axes of both the power rollers and the disks. These changes are brought by the loads exerted by the input disk and the output disk upon the power rollers when they are displaced in the aforesaid specific direction.

This mechanism is disclosed in, for instance, S.A.E. Technical Paper No. 901761.

A trunnion drive mechanism is disclosed, for example, in Tokkai Hei 2-283949 published by the Japanese Patent Office in 1990. The continuously variable transmission disclosed in this prior art is a so called double cavity type continuously variable transmission in which two toroidal speed change units are arranged in parallel, and each of these units comprises one set of power rollers arranged symmetrically. Each power roller is supported by a corresponding trunnion, and a piston is formed integrally with each trunnion in order to drive the trunnion in its abovementioned specific direction; hydraulic pressures act via hydraulic conduits upon these pistons as shown in FIG. 23.

In this figure, the pistons FR and FL are linked to trunnions which support the power rollers of one of the speed change units. In the same manner, the pistons RR and RL are linked to trunnions which support the power rollers of the other one of the speed change units.

The hydraulic pressures for driving the pistons are supplied from a speed change control valve S/V as an upshift pressure Pu or a downshift pressure Pd.

As will be understood from this figure, the hydraulic pressures always act upon the pistons FR and FL in opposite directions. In the same way, the hydraulic pressures always act upon the pistons RR and RL in opposite directions. Due to this, the two trunnions in the same speed change unit always shift in mutually opposite directions as shown by solid arrows in the figure.

Now, if due to an external disturbance a force F should act upon the piston RR in the direction shown in the figure by a dashed arrow, a pressure difference is set up between the hydraulic chambers on opposite sides of this piston RR, and this pressure difference is transmitted to the other pistons via the hydraulic pressure conduits, so that forces act upon the other pistons as shown by dashed arrows in the figure.

If the solid arrows in the figure are taken as indicating the upshift direction, then, although the external disturbing input force upon the piston RR is in the upshift direction, the forces which act as a result upon the other pistons FR, FL, and RL are in the downshift direction, as shown by the dashed arrows in the figure.

Accordingly, this type of external disturbing input force spoils the symmetrical displacement of the trunnions, and is a principal cause leading to vibration of the power rollers.

SUMMARY OF THE INVENTION

It is therefore an object of this invention to reinforce the resistance of power rollers against a vibration due to an external disturbance.

In order to achieve the above object, this invention provides a toroidal type continuously variable transmission in which a plurality of power rollers are squeezed between an input cone disk and an output cone disk which are arranged upon the same axis of rotation. The transmission comprises pistons respectively provided for the power rollers which in response to hydraulic pressure drive the power rollers in a direction perpendicular to the axis of rotation, so as to change a gyration angle of the power rollers, hydraulic chambers for exerting hydraulic pressure on the pistons, a speed change control valve which supplies hydraulic fluid to the hydraulic chambers, and a damping element which provides resistance to a stroke of at least one of the pistons in response to external disturbance.

It is preferable that the damping element be an orifice provided in an hydraulic fluid conduit which connects the speed change control valve to one of the hydraulic chambers.

It is further preferable that the orifice be elastically supported within the hydraulic fluid conduit so as to be capable of being displaced in the direction of flow of hydraulic fluid.

It is further preferable that the orifice be elastically supported by a coil spring.

It is also preferable that the orifice be elastically supported by a plate spring.

It is also preferable that each of the pistons be provided between two hydraulic chambers which drive the piston in mutually opposite directions, and the damping element comprises orifices provided in hydraulic fluid conduits which connect the speed control valve with hydraulic chambers which drive the pistons in a same speed change direction.

It is further preferable that the orifices are elastically supported within the hydraulic fluid conduits so as to be capable of being displaced in the direction of flow of hydraulic fluid.

It is also preferable that each of the pistons be provided between two hydraulic chambers which drive the piston in mutually opposite directions, and the damping element comprises orifices provided in hydraulic fluid conduits which connect the speed control valve with the hydraulic chambers.

It is further preferable that the orifices are elastically supported within the actuating hydraulic fluid conduits so as to be capable of being displaced in the direction of flow of hydraulic fluid.

It is also preferable that each of the pistons be provided between two hydraulic chambers which drive the piston in mutually opposite directions, and the damping element comprises a small cross section conduit which connects the hydraulic chambers.

It is also preferable that each of the pistons be provided between two hydraulic chambers which drive the piston in mutually opposite directions, and the damping element comprises extension chambers which are connected to the hydraulic chambers and increase the volume of the hydraulic chambers.

It is further preferable that the extension chambers comprise accumulators.

It is also preferable that the extension chambers are defined by a separation member which changes its separation position according to the pressure difference between the extension chambers.

It is also preferable that the damping element comprises a damper piston on the inner side of the hydraulic chamber which is displaced integrally with the piston, and an orifice which connects between hydraulic chambers separated by the damper piston.

It is also preferable that the transmission further comprises a stop which prevents a displacement of the piston beyond a specific position which corresponds to a predetermined speed change ratio for the continuously variable transmission.

The details as well as other features and advantages of this invention are set forth in the remainder of the specification and are shown in the accompanying drawings.

BRIEF DESCRIPTION OF THE DRAWINGS

FIG. 1 is a longitudinal sectional view of a toroidal type continuously variable transmission according to this invention.

FIG. 21 is a longitudinal sectional view of a damping choke according to an eighteenth embodiment of this invention.

FIGS. 22A and 22B are longitudinal sectional views of a damping orifice according to a nineteenth and a twentieth embodiment of this invention.

DESCRIPTION OF THE PREFERRED EMBODIMENTS

Figure 1:
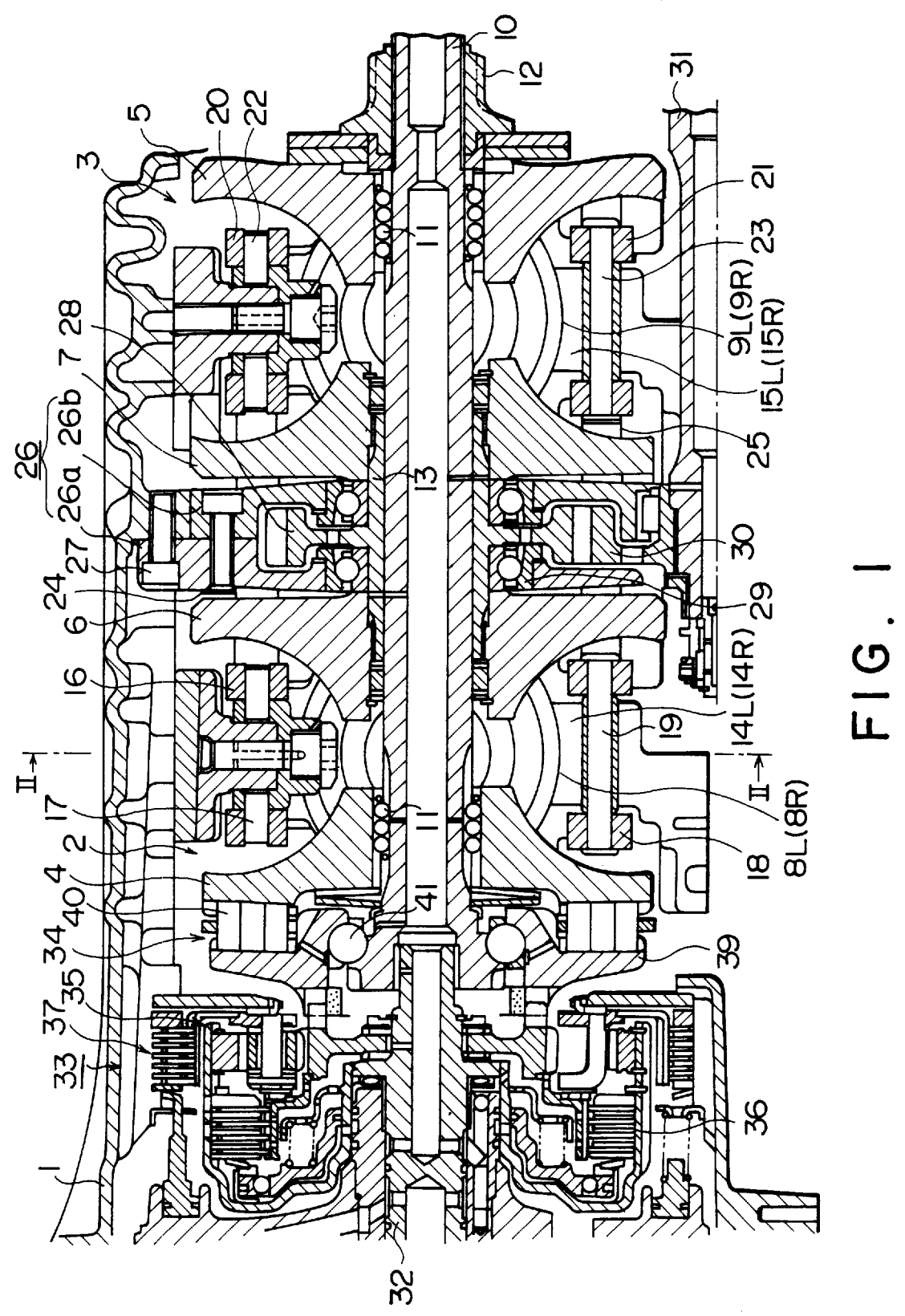
Figure 2:
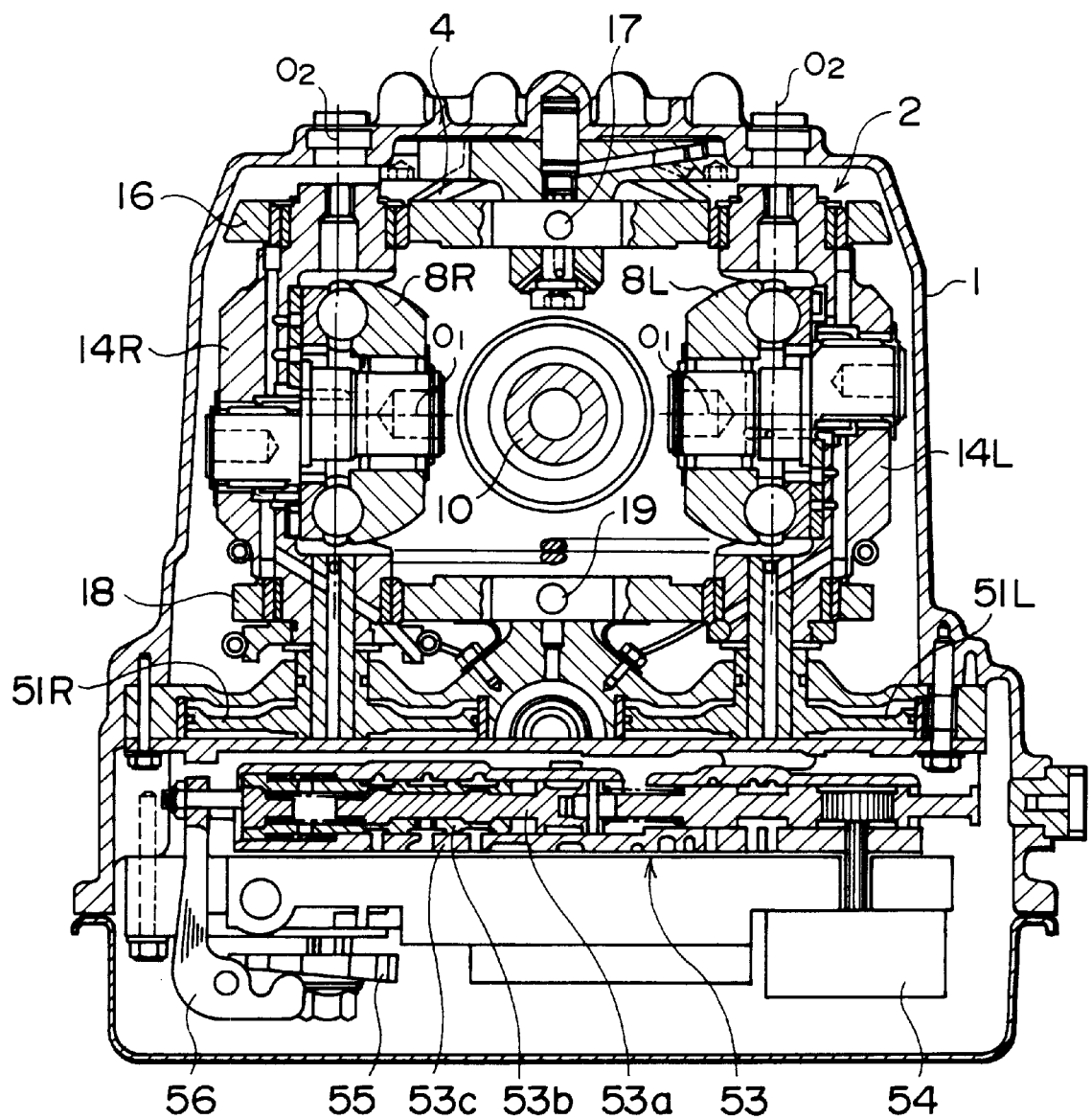
FIG. 2 is a cross sectional view of the toroidal type continuously variable transmission, taken along a line II—II of FIG. 1.

Referring to FIG. 1 of the drawings, a toroidal type continuously variable transmission comprises two speed change units 2 and 3 which are housed in parallel within a casing 1. These two speed change units 2 and 3 are provided in parallel in this manner in order to double the amount of drive transmission.

The speed change unit 2 comprises an input cone disk 4, an output cone disk 6, and a pair of power rollers 8L and 8R.

The speed change unit 3 comprises an input cone disk 5, an output cone disk 7, and a pair of power rollers 9L and 9R.

The speed change units 2 and 3 are disposed coaxially upon a main shaft 10 and collinearly with each other so that the output cone disks 6 and 7 are positioned back to back. The input cone disks 4 and 5 are engaged to the main shaft 10 by splines 11. A nut 12 is fitted to an end of main shaft 10 to prevent the input cone disk 5 from axial displacement.

The output cone disks 6 and 7 are engaged with a hollow output shaft 13 which is fitted over the outer surface of the main shaft 10.

The pair of power rollers 8R and 8L are squeezed between the input cone disk 4 and the output cone disk 6, and similarly the pair of power rollers 9R and 9L are squeezed between the input cone disk 5 and the output cone disk 7. The power rollers 8R and 8L are supported upon trunnions 14R and 14L respectively, and similarly the power rollers 9R and 9L are supported upon trunnions 15R and 15L respectively.

As shown in FIG. 2, the trunnions 14R and 14L are connected at their upper ends to an upper link 16 and at their lower ends to a lower link 18. The central portion of the upper link 16 is supported via a pin 17 by the casing 1, and the central portion of the lower link 18 is supported via a pin 19 by the casing 1. By doing this, it is ensured that the power rollers 8R and 8L of the speed change unit 2, which are supported by the trunnions 14R and 14L, are displaced in mutually opposite directions along the axial lines $O_2$ which are perpendicular to the axes of rotation $O_1$ of said power rollers.

In the same manner, the trunnions 15R and 15L of the speed change unit 3 are connected to an upper link 20 and to a lower link 21. These links 20 and 21 are supported via pins 22 and 23 by the casing 1. By doing this, it is ensured that the power rollers 9R and 9L of the speed change unit 3, which are supported by the trunnions 15R and 15L, are displaced in mutually opposite directions along the axial lines $O_2$ which are perpendicular to the axes of rotation $O_1$ of said power rollers.

The upper links 16 and 20 are connected together by an engaging member 24, and the lower links 18 and 21 are connected together by an engaging member 25. By doing this, it is ensured that the displacements of the power rollers along the axial lines $O_2$ ware performed synchronously for both the two speed change units 2 and 3.

An output gear housing 26 is disposed between the output cone disks 6 and 7. This output gear housing 26 comprises two individual members 26a and 26b which are fixed together by bolts, and the individual member 26a is fixed to the casing 1 by bolts 27. The output gear housing 26 supports the hollow output shaft 13 via ball bearings 29 so that it is free to rotate.

An output gear 28 which is formed integrally with the hollow output shaft 13 is received within the output gear housing 26. Rotation of this output gear 28 is transmitted via a counter gear 30 to a counter shaft 31. The power output of this speed change device is taken out from the counter shaft 31.

An input shaft 32 of this speed change device is disposed coaxially with the main shaft 10. The rotation of this input shaft is transmitted to the input cone disks 4 and 5 via a forward/reverse switchover construction 33 and via a loading cam 34.

This forward/reverse switchover construction 33 comprises a simple planetary gear unit 35, a forward clutch 36, and a reverse brake 37. When the forward clutch 36 is engaged the planetary gear unit 35 is put into the directly connected state, and thereby the rotation of the input shaft 32 is transmitted directly to the cam flange 39 of the loading cam 34.

This cam flange 39 is adjacent to the input cone disk 4 of the speed change unit 2, and is supported via an angular bearing 41 upon the main shaft 10 so as to be freely rotatable. Cam rollers 40 are interposed between the cam flange 39 and the input cone disk 4.

Upon relative rotation of the cam flange 39 and the input cone disk 4, these cam rollers 40 generate thrust force in the shaft direction. This thrust force squeezes the power rollers 8R and 8L between the input cone disk 4 and the output cone disk 6, and also squeezes the power rollers 9R and 9L between the input cone disk 5 and the output cone disk 7. The rotation of the cam flange 39 is transmitted via the loading cam 34 to the input cone disk 4, and is also transmitted to the input cone disk 5 via a ball spline 11 and the main shaft 10. And this rotation of the input cone disk 4 is transmitted to the power rollers 8R and 8L so as to rotate these power rollers 8R and 8L around their axial lines $O_1$, and this rotation of the power rollers 8R and 8L is transmitted to the output cone disk 6. Similarly, the rotation of the input cone disk 5 is transmitted to the power rollers 9R and 9L so as to rotate these power rollers 9R and 9L around their axial lines $O_1$, and this rotation of the power rollers 9R and 9L is transmitted to the output cone disk 7.

The rotation of the output cone disks 6 and 7 is taken out via the output gear 28, the counter gear 30, and the counter shaft 31 as the power output from this continuously variable transmission.

The gyration angles of the power rollers 8R and 8L are varied by displacement of the trunnions 14R and 14L in mutually opposite directions along the axial lines $O_2$ shown in FIG. 2. When these gyration angles of the power rollers 8R and 8L are altered, the radiuses of the contact portions between the power rollers 8R and 8L and the input cone disk 4 and the radiuses of the contact portions between the power rollers 8R and 8L and the output cone disk 6 change, and thereby the speed change ratio of the transmission of rotation between the input cone disk 4 and the output cone disk 6, i.e., the speed change ratio of the speed change unit 2, is altered. And the speed change ratio of the speed change unit 3 is altered in the same manner by alteration of the gyration angles of the power rollers 9R and 9L.

This speed change control by shifting the trunnions 14R and 14L, and 15R and 15L, along the axial lines $O_2$ will now be explained.

Pistons 51R and 51L are respectively engaged with the trunnions 14R and 14L. Similarly, as shown in FIG. 3, pistons 52R and 52L are respectively engaged with the trunnions 15R and 15L.

Figure 3:
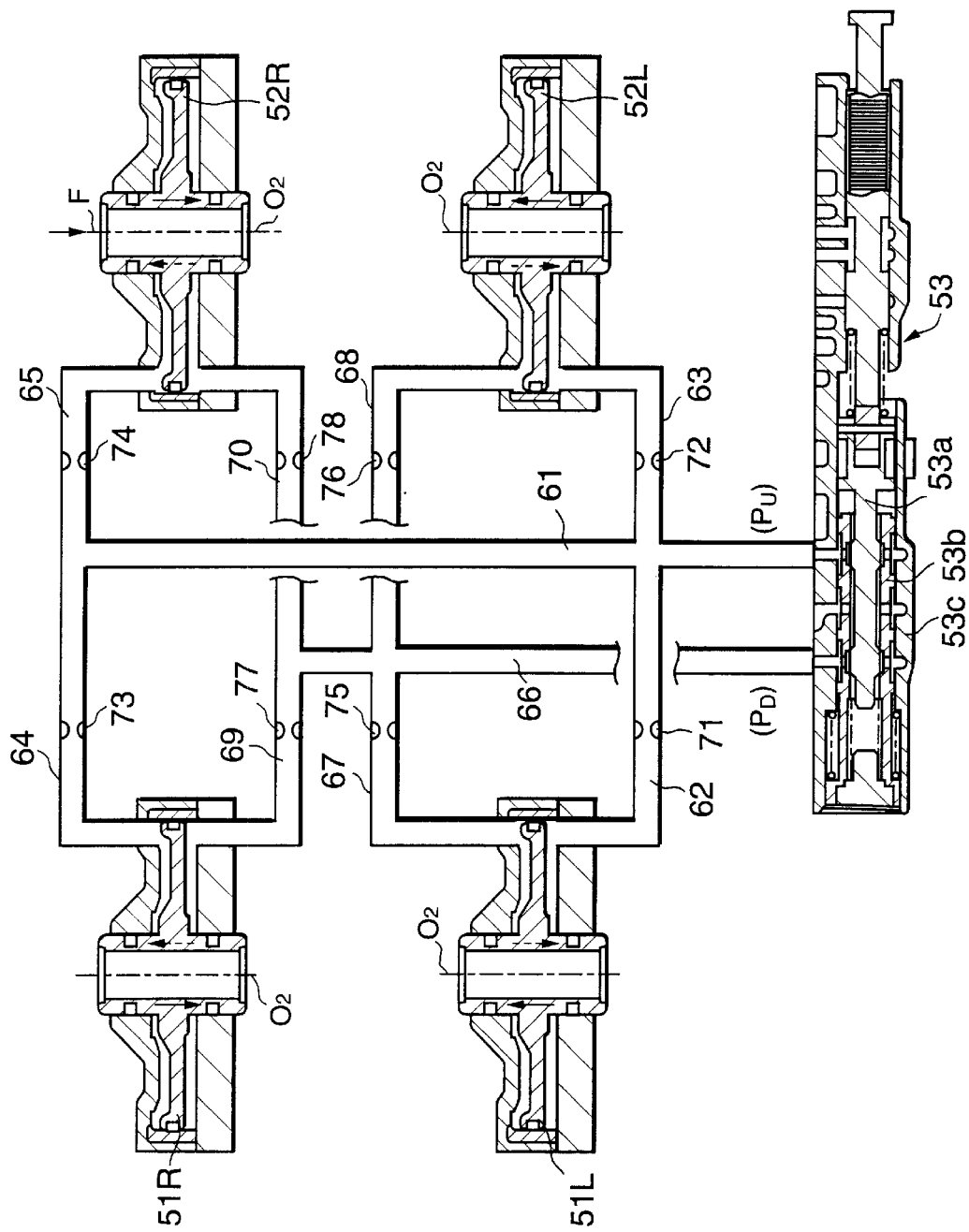
FIG. 3 is a hydraulic pressure circuit diagram of the toroidal type continuously variable transmission.

These pistons are shifted in the directions shown by the solid arrows in FIG. 3 by an upshift pressure Pu which is supplied by a speed change control valve 53, and thereby they change the gyration angles of the power rollers 8R and 8L, and 9R and 9L, in their upshift directions. Further, these pistons are shifted in the directions shown by the dashed arrows in the figure by an downshift pressure Pd which is supplied by the speed change control valve 53, and thereby they change the gyration angles of the power rollers 8R and 8L, and 9R and 9L, in their downshift directions.

The speed change control valve 53 is a per se known type of valve which is disclosed in the aforementioned prior art Tokkai Hei 2-283949. The speed change control valve 53 comprises a spool shaped valve body 53a which is fitted into a sleeve 53b, and this sleeve 53b is fitted into a casing 53c. The valve body 53a is driven by a stepping motor not shown in the figure, and, when it is displaced with respect to the sleeve 53b in the axial direction from its neutral position, the upshift pressure Pu is raised and the downshift pressure Pd is lowered, for example.

The upshift pressure Pu, as shown in FIG. 3, is supplied via branch conduits 62 and 63 to pressure chambers on the lower sides of the pistons 51L and 52L. Further, it is also supplied via branch conduits 64 and 65 to pressure chambers on the upper sides of the pistons 51R and 52R.

Similarly, the downshift pressure Pd is supplied via branch conduits 67 and 68 to pressure chambers on the upper sides of the pistons 51L and 52L Further, it is also supplied via branch conduits 69 and 70 to pressure chambers on the lower sides of the pistons 51R and 52R.

A precess cam 55 is fixed to the lower end of the trunnion 14R. Via a link 56, this precess cam 55 mechanically feeds back to the sleeve 53b the amount of displacement of the trunnion 14R in the direction of the axial line $O_2$, thus causing relative displacement of the sleeve 53b with respect to the valve body 53a.

When a desired speed change ratio has been attained, the relative displacement between the sleeve 53b and the valve body 53a returns to the neutral state by this feedback, and the forces which act upon the trunnions 14R and 14L and upon the trunnions 15R and 15L return to their initial states, so that the inclined rotation angles of the power rollers 8R and 8L and of the power rollers 9R and 9L, in other words the speed change ratios, are maintained in this state.

Respective damping orifices 71 are provided in the branch conduits 62 through 65, and respective damping orifices 75 through 78 are provided in the branch conduits 67 through 70, these damping orifices serving as damping elements. It would alternatively be possible to use chokes instead of orifices.

These damping orifices serve the following function.

Suppose that, when during speed change a force F due to external disturbance acts upon the piston 52R in the upshift direction as shown in FIG. 3, the piston 52R is displaced in the direction in which this force acts.

At this time, the damping orifices 74 and 78 which have been provided in the branch conduits 65 and 70 exert resistance upon the displacement by the force F of the piston 52R, according to the speed of this displacement. Further, the pressure difference which the force F causes between the upper and lower pressure chambers of the piston 52R is transmitted to the pressure chambers of the other pistons 51R, 51L, and 52L, and, although this pressure difference displaces these pistons in the directions of the dashed arrows in the figure, the displacements of these pistons are reduced, because the damping orifices which are positioned in the paths of the flows of these operating pressures exert resistance upon these pressure flows. Thereby, it is possible to reduce vibration due to external disturbance, which may spoil the synchronization of the power rollers.

Figure 4:
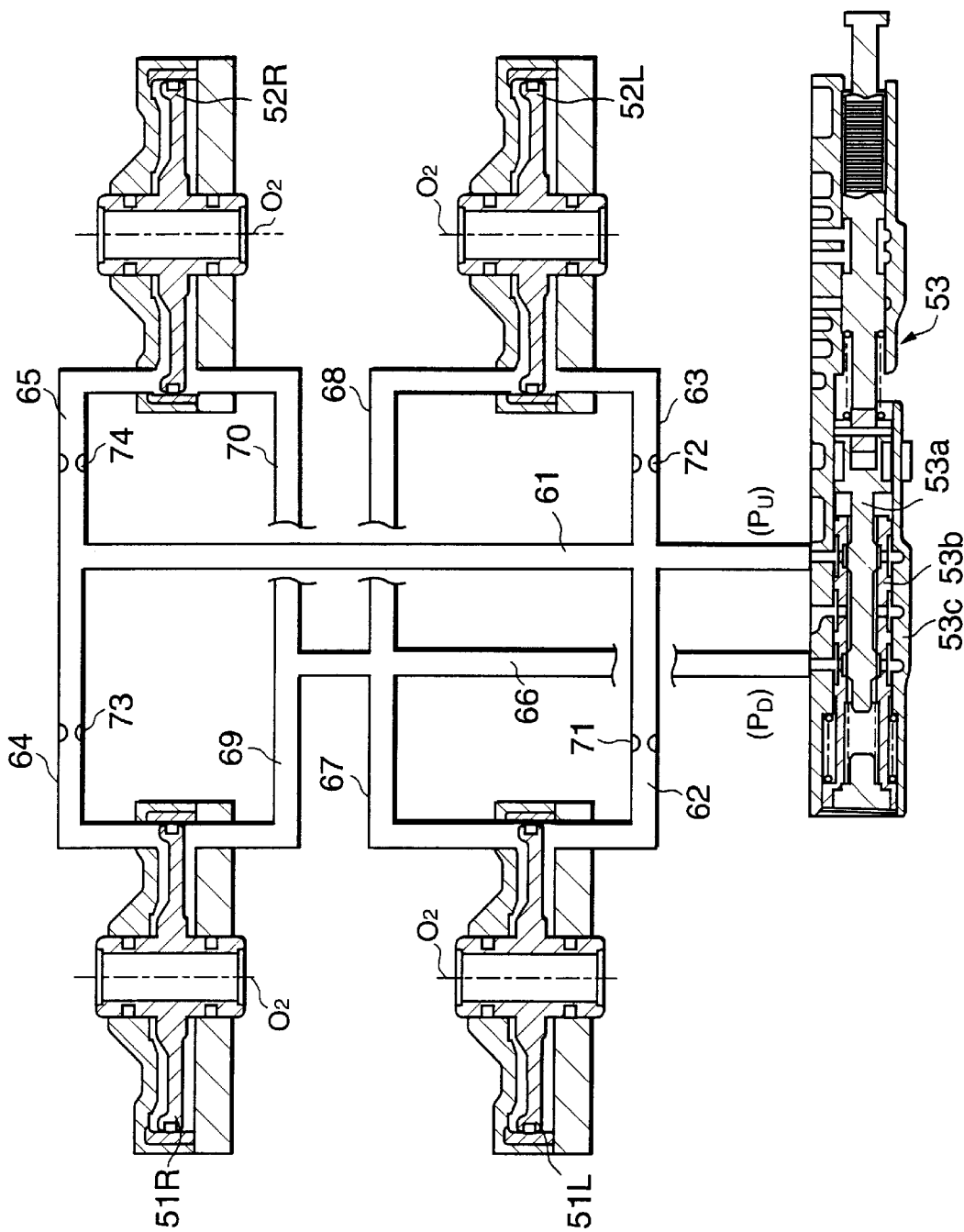
FIG. 4 is similar to FIG. 3, but showing a second embodiment of this invention.

FIG. 4 shows a second embodiment of this invention, in which damping orifices 71 through 74 are provided in the branch conduits 62 through 65 for the upshift pressure Pu, but on the other hand no damping orifices are provided in the branch conduits 67 through 70 for the downshift pressure Pd.

Figure 5:
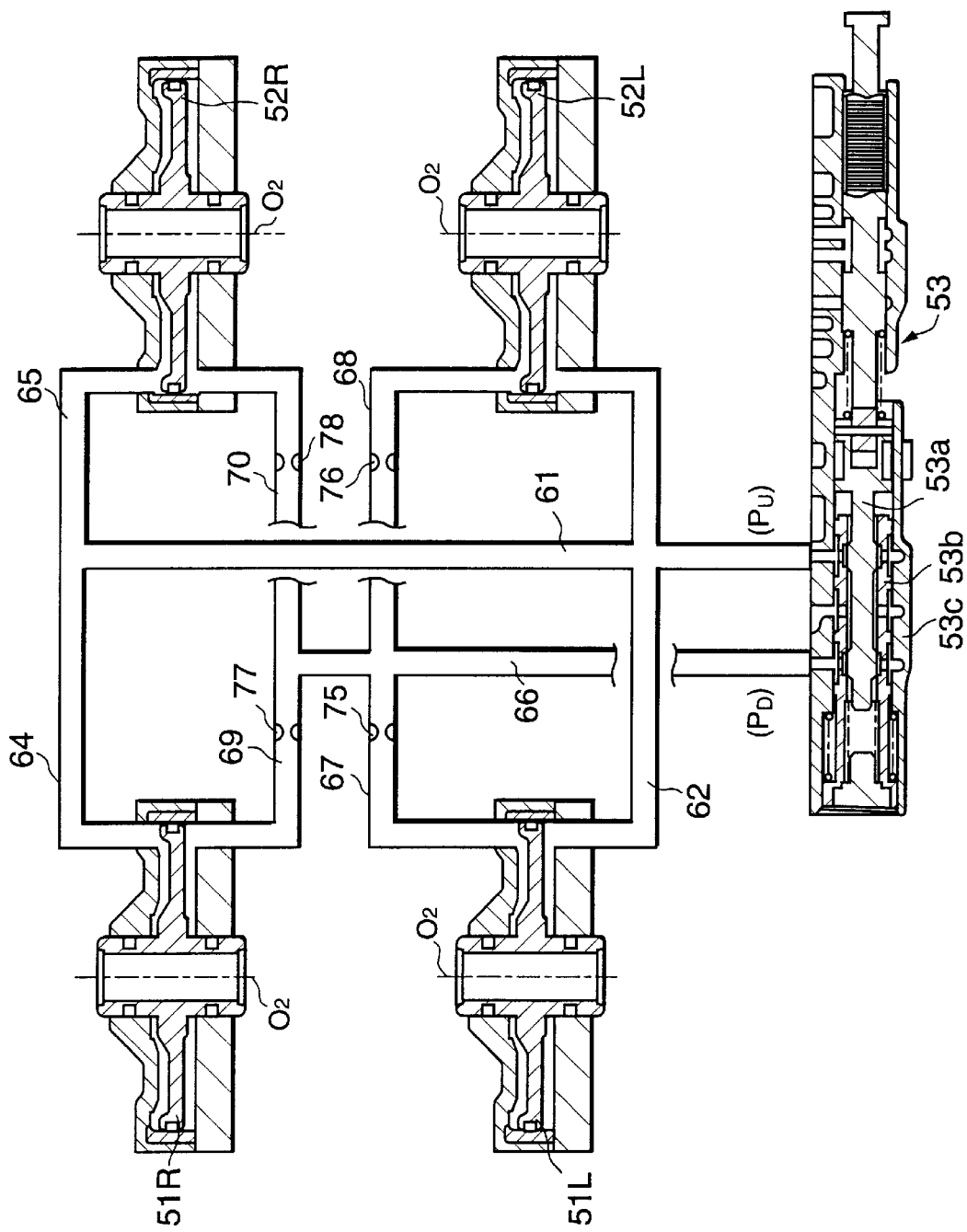
FIG. 5 is similar to FIG. 3, but showing a third embodiment of this invention.

FIG. 5 shows a third embodiment of this invention, in which damping orifices 75 through 78 are provided in the branch conduits 67 through 70 for the downshift pressure Pd, but on the other hand no damping orifices are provided in the branch conduits 62 through 65 for the upshift pressure Pu.

As shown in these second and third embodiments, considerable effects can be obtained even if the damping orifices are only provided in some specified ones of the branch conduits.

Figure 6A:
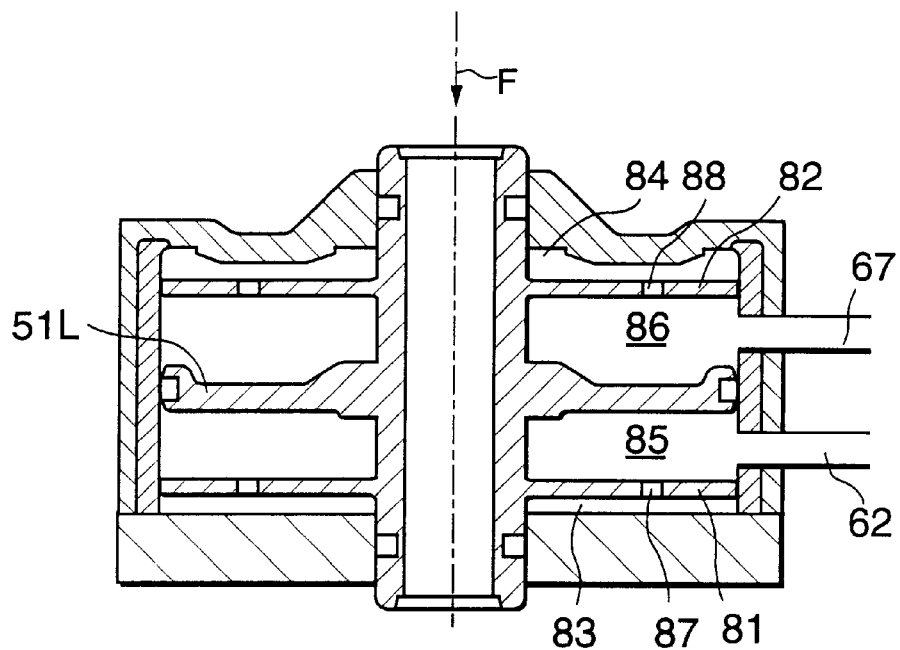
FIGS. 6A and 6B are respectively a longitudinal sectional view of a servo piston and a plan view of a damper piston according to a fourth embodiment of this invention.
Figure 6B:
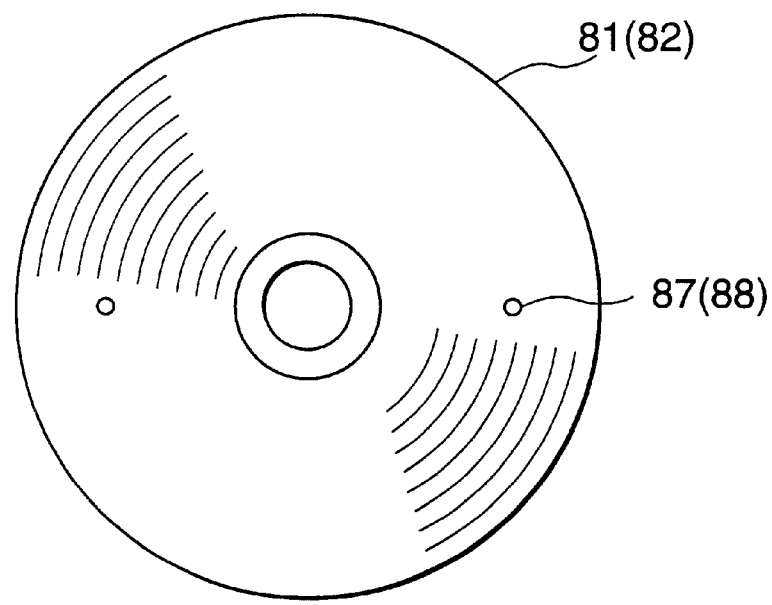

FIGS. 6A and 6B show a fourth embodiment of this invention.

In this embodiment damper pistons 81 and 82 are fitted below and above the piston 51L. By doing this a hydraulic chamber 85 is defined between the piston 51L and the lower damper piston 81, and another hydraulic chamber 86 is defined between the piston 51L and the upper damper piston 82.

Further, a hydraulic chamber 83 is defined below the lower damper piston 81, and another hydraulic chamber 84 is defined above the upper damper piston 82.

Orifices 87 are formed through the lower damper piston 81 and communicate the hydraulic chamber 85 with the hydraulic chamber 83, and orifices 88 are formed through the upper damper piston 82 and communicate the hydraulic chamber 86 with the hydraulic chamber 84.

The damper pistons 81 and 82 are displaced integrally together with the piston 51L, and as they are thus displaced the volumes of the hydraulic chambers 83 and 84 increase and decrease. At this time the restriction of the flow of hydraulic fluid through the orifices 87 and the orifices 88 exerts a resistance upon the displacement of the piston 51L. Further, the pressure difference generated between the hydraulic chambers 83 and 84 by the force F, which is transmitted through the branch conduits 62 and 67 to the hydraulic chambers of the other pistons, is damped by these orifices. Due to this, the exertion of influence by the force F due to external disturbance upon the displacement of the other pistons 51R, 52R, and 52L is restrained, and spoiling of the synchronization of the pistons due to vibration is prevented. It would also be possible to provide the branch conduits 62 and 67 with further damping orifices as well.

Figure 7:
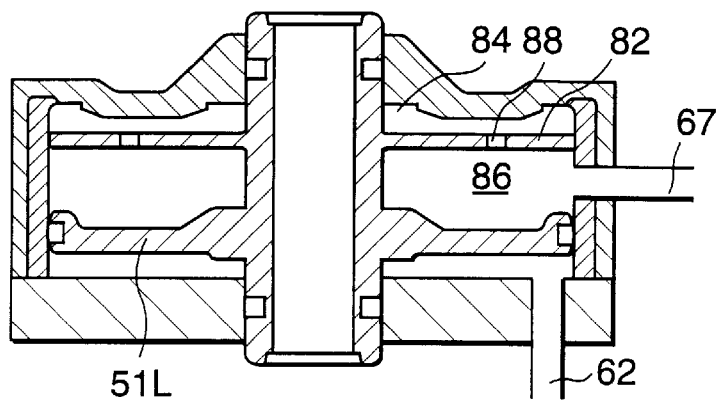
FIG. 7 is similar to FIG. 6A, but showing a fifth embodiment of this invention.
Figure 8:
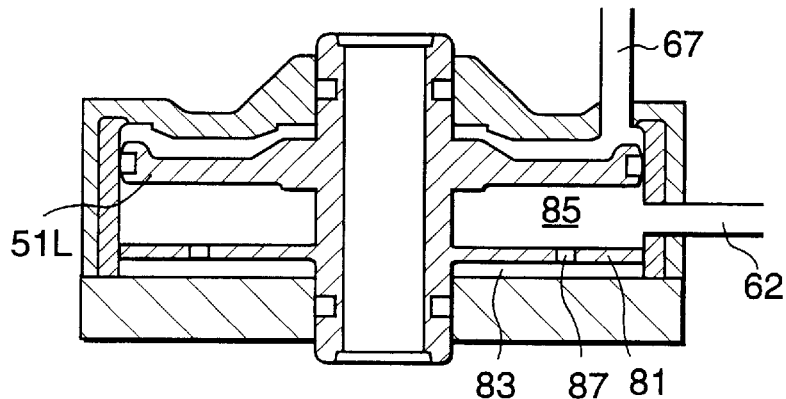
FIG. 8 is similar to FIG. 6A, but showing a sixth embodiment of this invention.

FIG. 7 shows a fifth embodiment of this invention, in which the damper piston 81 has been omitted and only the damper piston 82 is provided; and FIG. 8 shows a sixth embodiment of this invention, in which the damper piston 82 has been omitted and only the damper piston 81 is provided. It is possible, by reducing the number of damping orifices in this manner, to restrain to the minimum the deterioration of speed change responsiveness due to the provision of the damping orifices, while nevertheless obtaining the desired action for inhibition of vibration which could spoil the intended synchronization.

Figure 9:
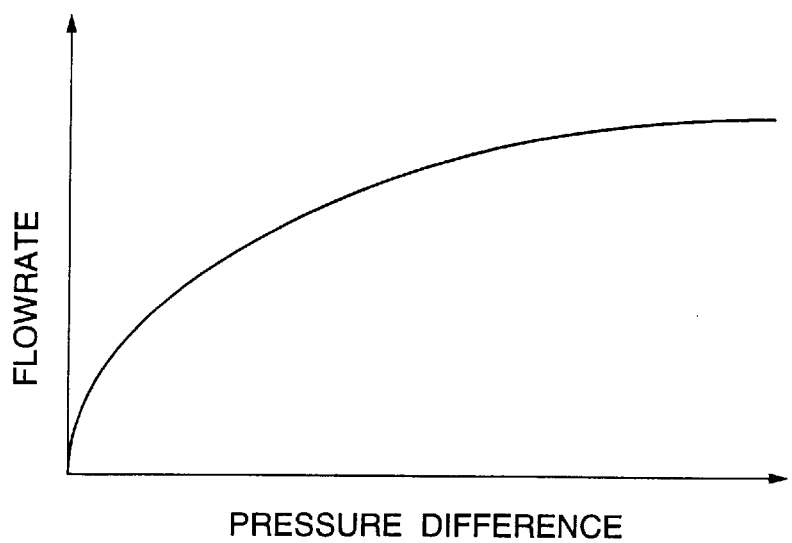
FIG. 9 is a graph showing a relationship between a flow amount of an orifice and a pressure difference across the orifice.

Now, with the above described embodiment, if it is desired to enhance the function for prevention of vibration which could spoil synchronization, the diameters of the damping orifices must be made smaller. However, when the diameters of the damping orifices are made smaller, it becomes easier for them to become blocked up. Further, in the low temperature state in which the viscosity of the hydraulic fluid is high, the pressure differences between the upstream sides and the downstream sides of the orifices abruptly become elevated with respect to the amount of fluid flowing through these orifices as shown in FIG. 9.

Further, large differences occur due to temperature in the effectivenesses of the damping orifices, due to the fact that the leakage amounts of hydraulic fluid between the hydraulic chambers above and below the pistons also vary greatly depending upon temperature.

Figure 10:
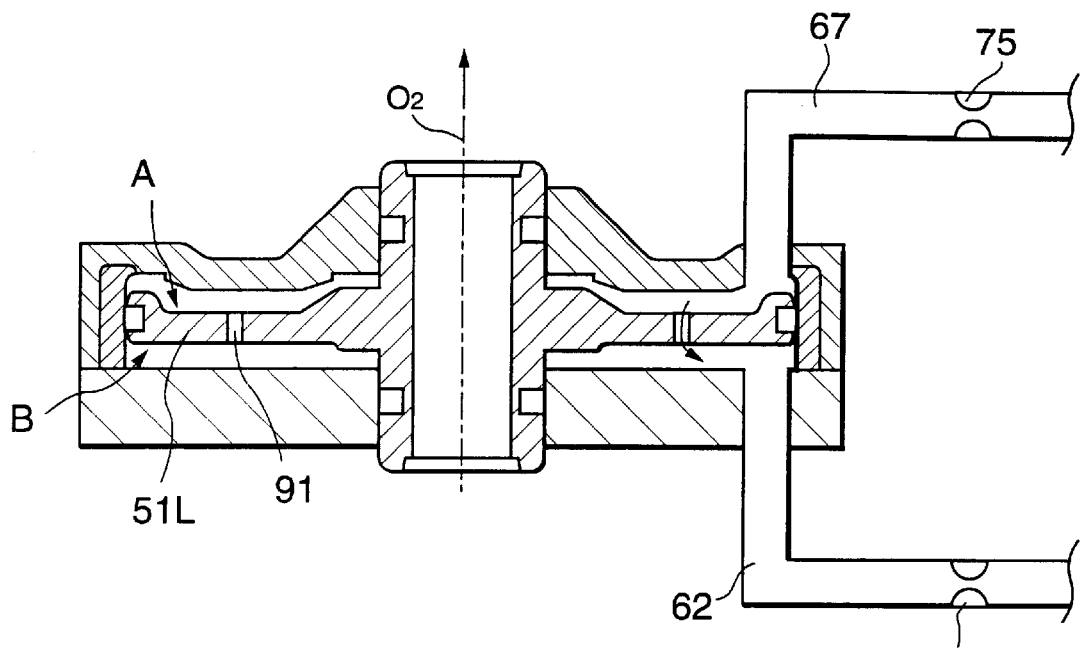
FIG. 10 is a longitudinal sectional view of a servo piston according to a seventh embodiment of this invention.

FIG. 10 shows a seventh embodiment of this invention which is constructed with the objective of coping with this problem. In this embodiment orifices 91 are formed in the piston 51L, and thereby it is arranged that, if there is a difference between the pressures in the hydraulic chambers above and below the piston 51L, the pressurized fluid can flow from the high pressure side to the low pressure side.

When the piston 51L is displaced in the upwards direction as shown by the arrow in the figure, the pressure in the upper hydraulic chamber A rises. At this time the pressure rise in the upper hydraulic chamber A is alleviated, since actuating hydraulic fluid flows from the upper hydraulic chamber A through the orifices 91 into the lower hydraulic chamber B. Accordingly it is possible to restrain the transmission of pressure differences to the other pistons, even if the diameters of the damping orifices 71 and 75 are not made particularly small. Further it is unlikely that slowness of speed change response will occur, even when the temperature of the actuating hydraulic fluid is low and its viscosity is high.

It is possible to obtain limited effects, even if the damping orifices 71 and 75 are not provided.

Figure 11:
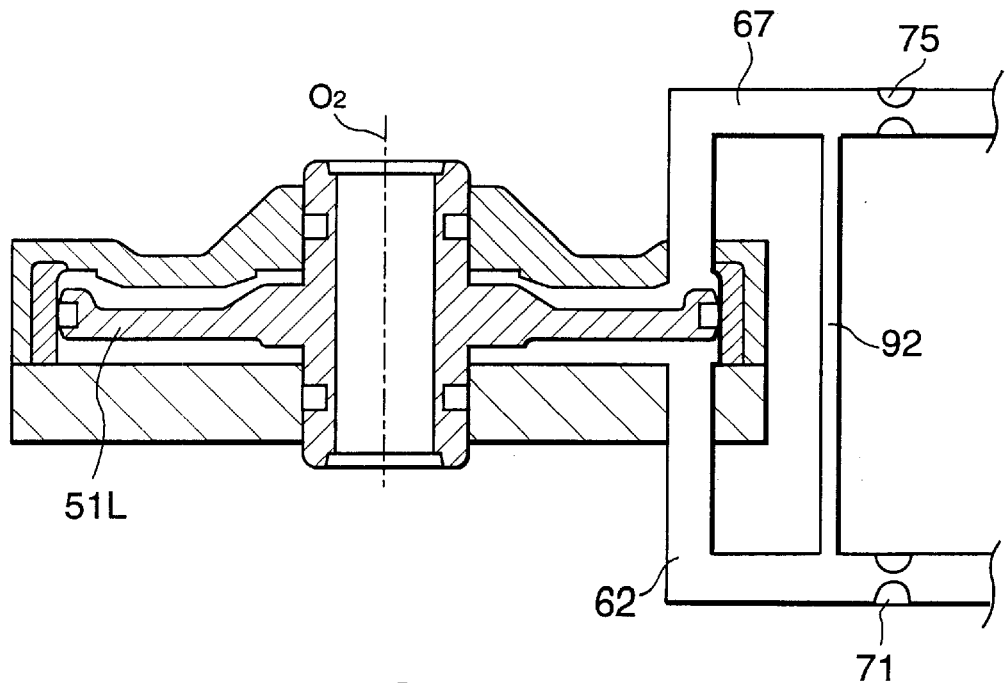
FIG. 11 is similar to FIG. 10, but showing a eighth embodiment of this invention.

FIG. 11 shows a eighth embodiment of this invention.

In this embodiment, instead of the orifices 91 being formed through the piston 51L, a communicating passage 92 of a small diameter is provided which connects together the branch conduits 62 and 67. With this eighth embodiment, it is possible to obtain the same beneficial effects as with the seventh embodiment described above.

Figure 12:
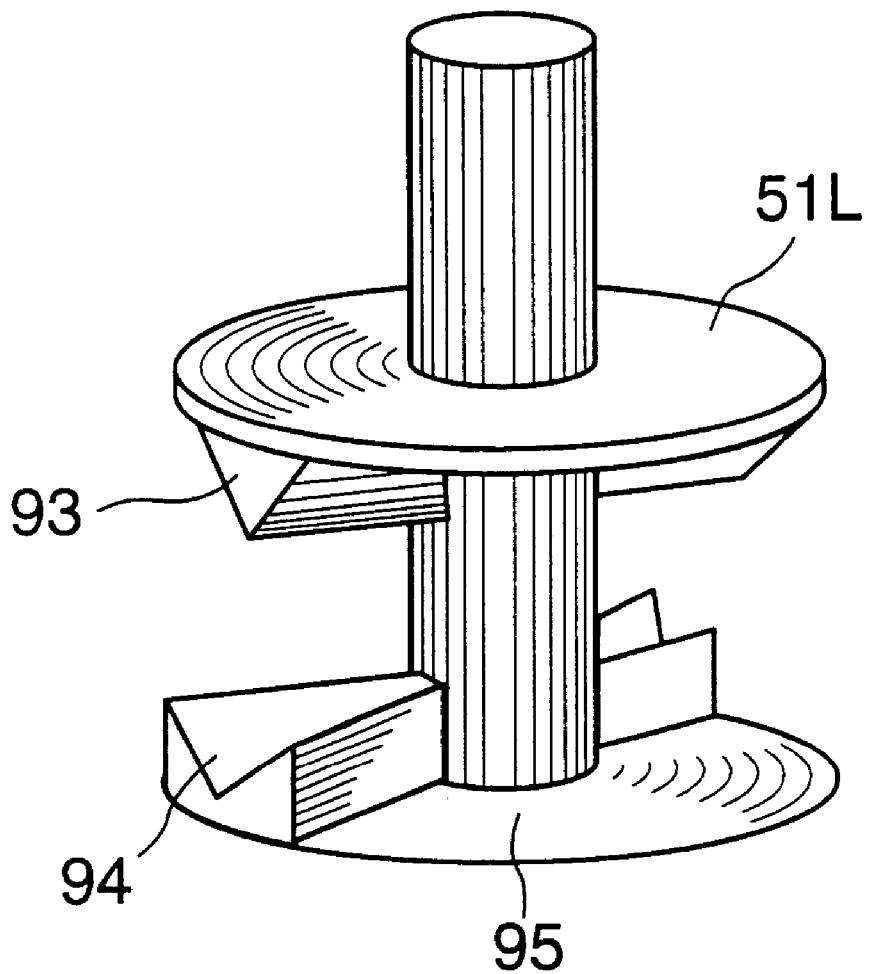
FIG. 12 is a perspective view of a servo piston according to a ninth embodiment of this invention.

FIG. 12 shows a ninth embodiment of this invention.

In this embodiment projections 93 are formed on the lower surface of the piston 51L, and concave portions 94 are formed in the surface 95 of the piston cylinder so as to be engaged with these projections 93 when the piston 51L moves downwards. Even if the supply of hydraulic pressure for speed change control for the speed change device fails, for example due to a failure of the speed change control valve or the like, the piston 51L does not drop downwards past the position at which the projections 93 engage with the concave portions 94. Due to this, it is possible to fix the speed change ratio at a value at which starting the vehicle off from rest and driving it are possible. The concept of this embodiment can be applied to all of the other embodiments of this invention as well.

Figure 13:
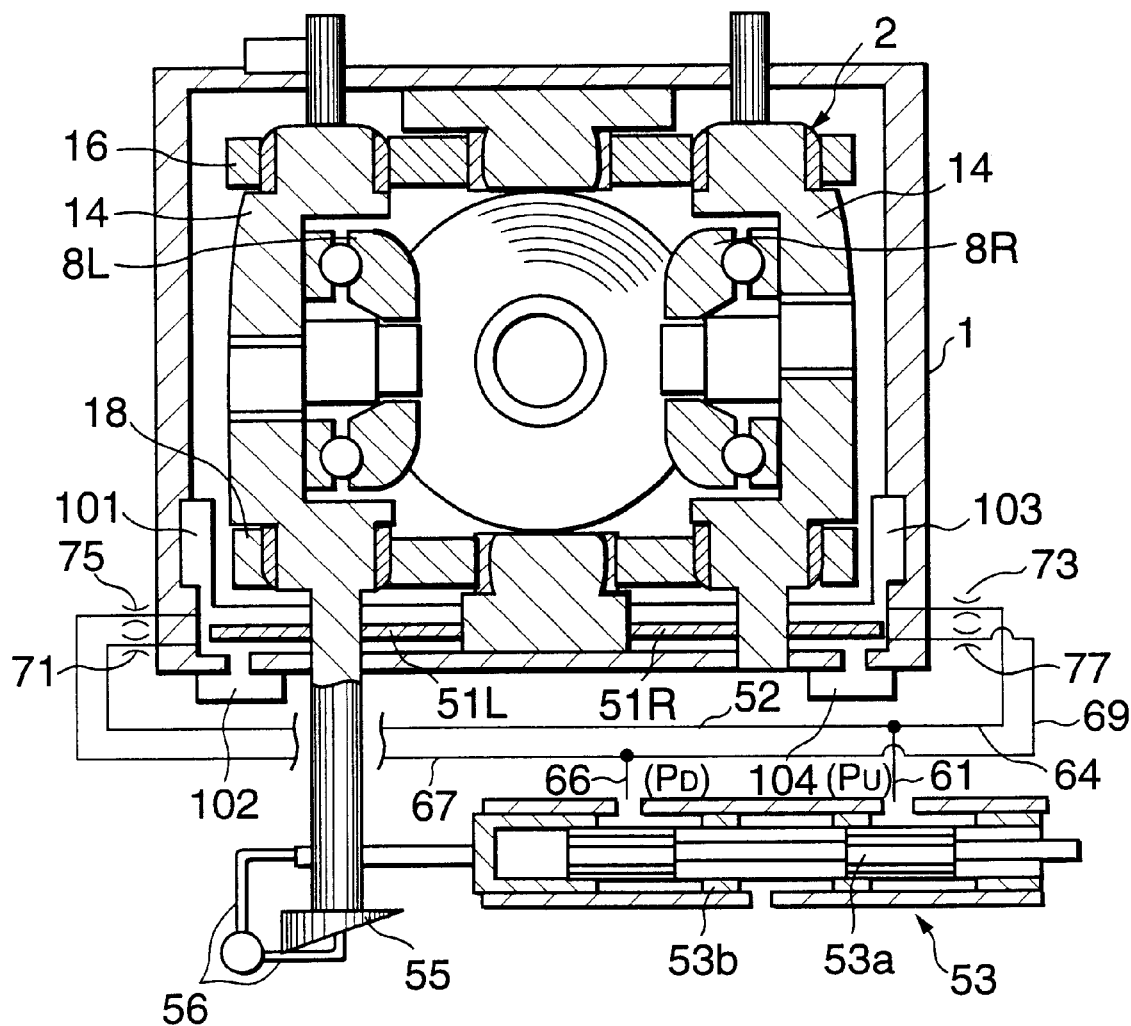
FIG. 13 is a cross sectional view of a toroidal type continuously variable transmission according to a tenth embodiment of this invention.

FIG. 13 shows a tenth embodiment of this invention.

The toroidal type continuously variable transmission according to this embodiment is of a single cavity type which comprises only one speed change unit A. Respective extension chambers 101 through 104 are connected to the hydraulic chambers above and below the pistons 51R and 51L. Further, respective damping orifices 71, 73, 75, and 77 are provided in branch conduits 63, 64, 67, and 69 which lead to these hydraulic chambers.

If the density of the fluid is termed ρ and the flowrate of the fluid is termed Q, then the relationship between the opening area S of an orifice and the pressure difference ΔP upstream and downstream of it is given by the following equation (1):

$$Q = E_0 \cdot S \cdot \sqrt{\frac{\Delta P}{\rho}} \quad (1)$$

where, $E_0$ is a constant.

Further, if the flowrate of the flow into the piston chamber is termed Q, the piston area is termed A, the piston chamber volume is termed V, the speed of displacement of the piston is termed Vx, the amount of displacement of the piston is termed x, and the coefficient of elasticity of the hydraulic fluid is termed k, then the pressure Pa which acts on the one surface of the piston is given by the following equation (2):

$$Pa = \int \frac{k \cdot (Q - A \cdot Vx)}{V + A \cdot x} \cdot dt \quad (2)$$

The following equation (3) is obtained when the above equation (1) is substituted into this equation (2):

$$Pa = \int \frac{k \cdot \left(E_0 \cdot S \cdot \sqrt{\frac{\Delta P}{\rho}} - A \cdot Vx\right)}{V + A \cdot x} \cdot dt \quad (3)$$

In this equation x can be ignored because the displacement is extremely small. If x is taken as zero, the following equation (4) is obtained:

$$Pa = \int \frac{k \cdot \left(E_0 \cdot S \cdot \sqrt{\frac{\Delta P}{\rho}} - A \cdot Vx\right)}{V} \cdot dt \quad (4)$$

It will be understood from this equation that if the piston chamber volume V is made large then the pressure Pa which acts upon the piston becomes small, and almost the same beneficial effect is obtained as when the orifice opening area S is made small.

Accordingly, even if the diameters of the damping orifices 71, 73, 75, and 77 are not made particularly small, it is possible to prevent vibration which could spoil synchronization by providing the extension chambers 101 through 104 as shown in FIG. 13.

Figure 14:
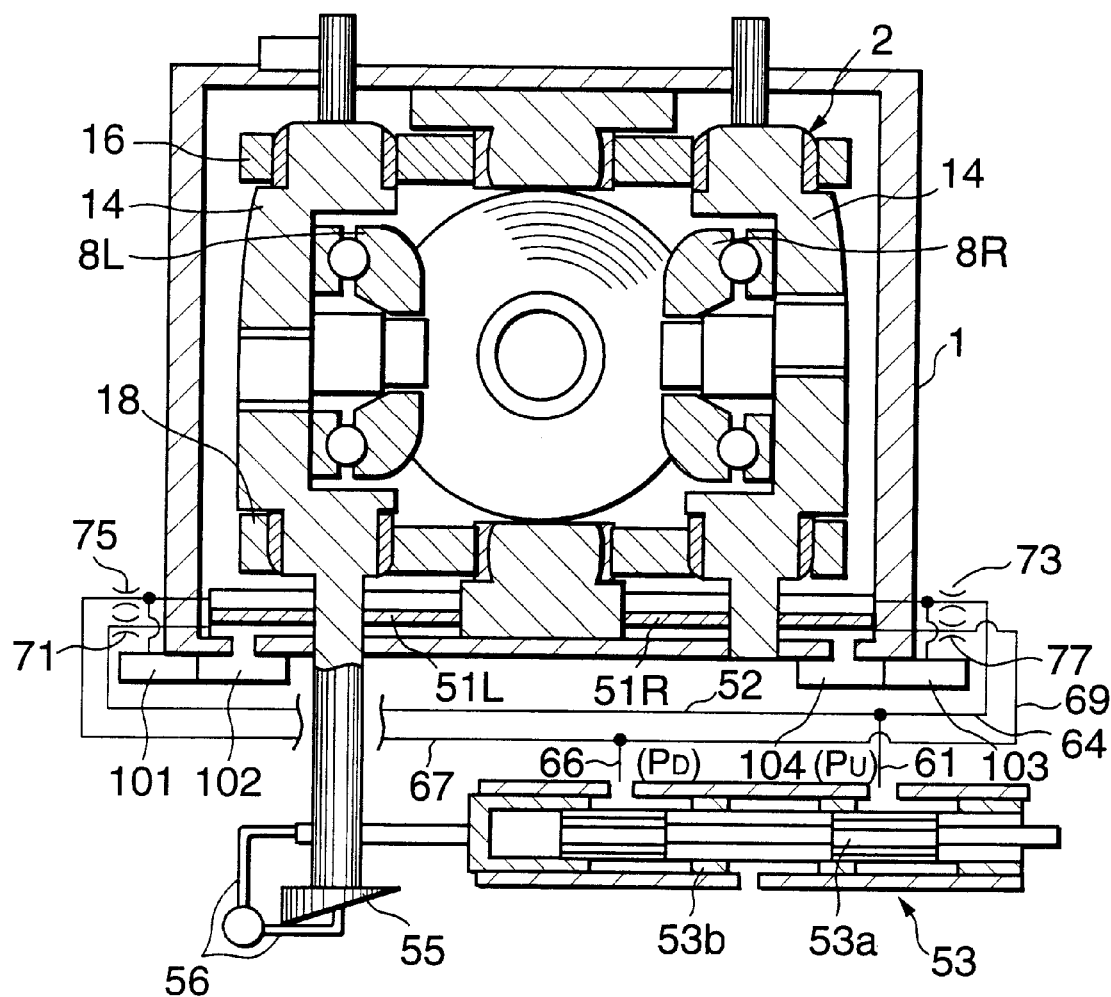
FIG. 14 is a cross sectional view of a toroidal type continuously variable transmission according to a eleventh embodiment of this invention.

FIG. 14 shows an eleventh embodiment of this invention. In this embodiment, instead of connecting the extension chambers 101 and 103 to the hydraulic chambers on the upper sides of the pistons 51L and 51R, they are respectively connected to the branch conduit 67 and 64.

The same benefits which are obtained with the tenth embodiment are available with this embodiment as well.

It should be noted that the branch conduits 62, 64, 67, and 69 have fixed resistance, and can be considered as constituting orifices in themselves. Accordingly, by setting the capacities of the extension chambers, it is possible to omit the damping orifices 71, 73, 75, and 77 in the tenth and the eleventh embodiments.

Figure 15:
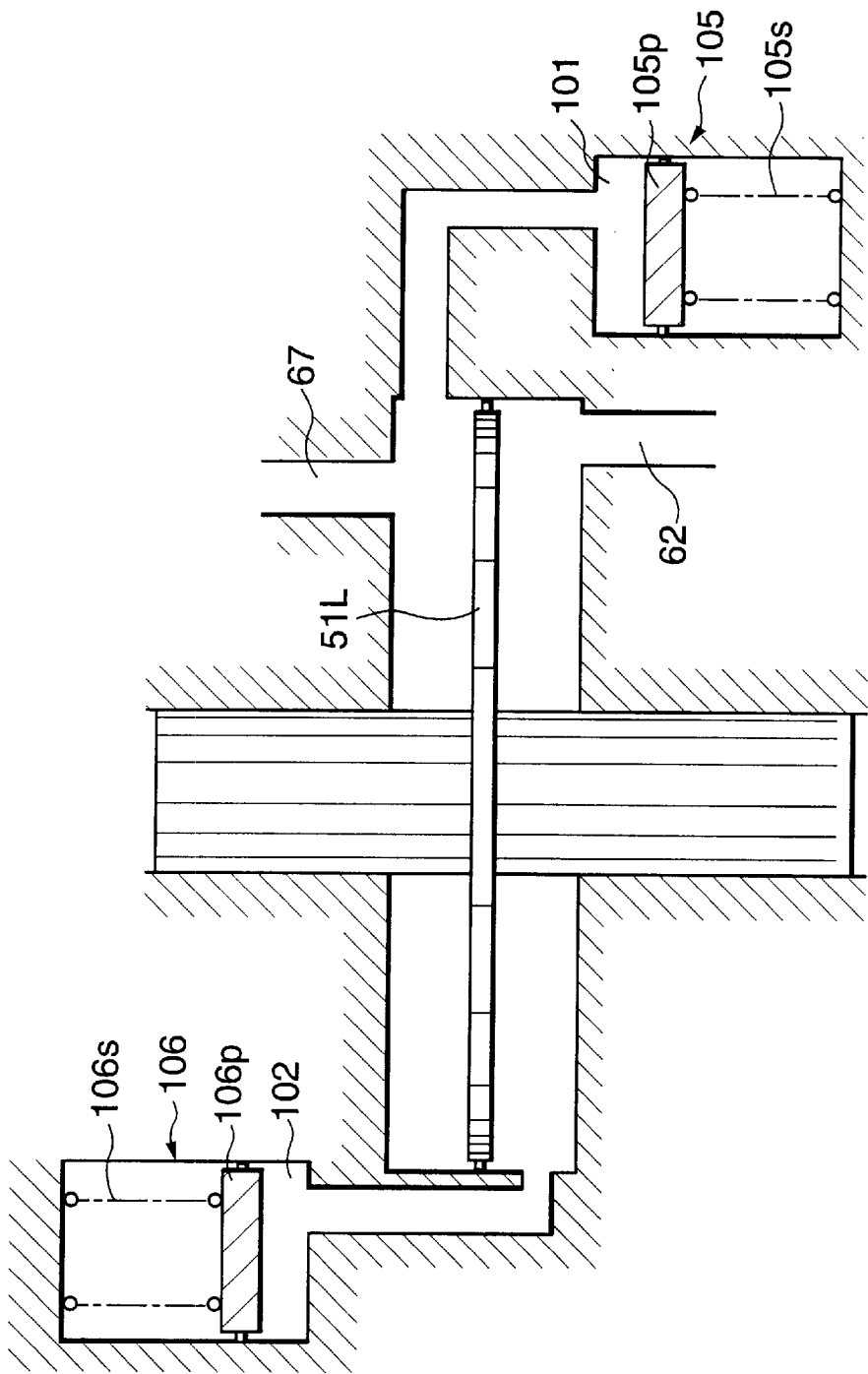
FIG. 15 is a hydraulic pressure circuit diagram of a servo piston according to a twelfth embodiment of this invention.

FIG. 15 shows a twelfth embodiment of this invention.

In this embodiment, the extension chambers 101 and 102 are defined by accumulators 105 and 106. These accumulators 105 and 106 are respectively provided with pistons 105P and 106P and with springs 105S and 106S which bias these pistons 105P and 106P.

When the extension chambers are constituted in this manner by accumulators, the coefficient of elasticity k in equation (2) should be replaced by the spring constants of the springs 105S and 106S. Accordingly it is possible to obtain any desired pressure characteristic by setting these spring constants at will, and it is possible to obtain the same operation as with the tenth and eleventh embodiments in a small space; and thereby it is possible to make the device more compact.

Figure 16:
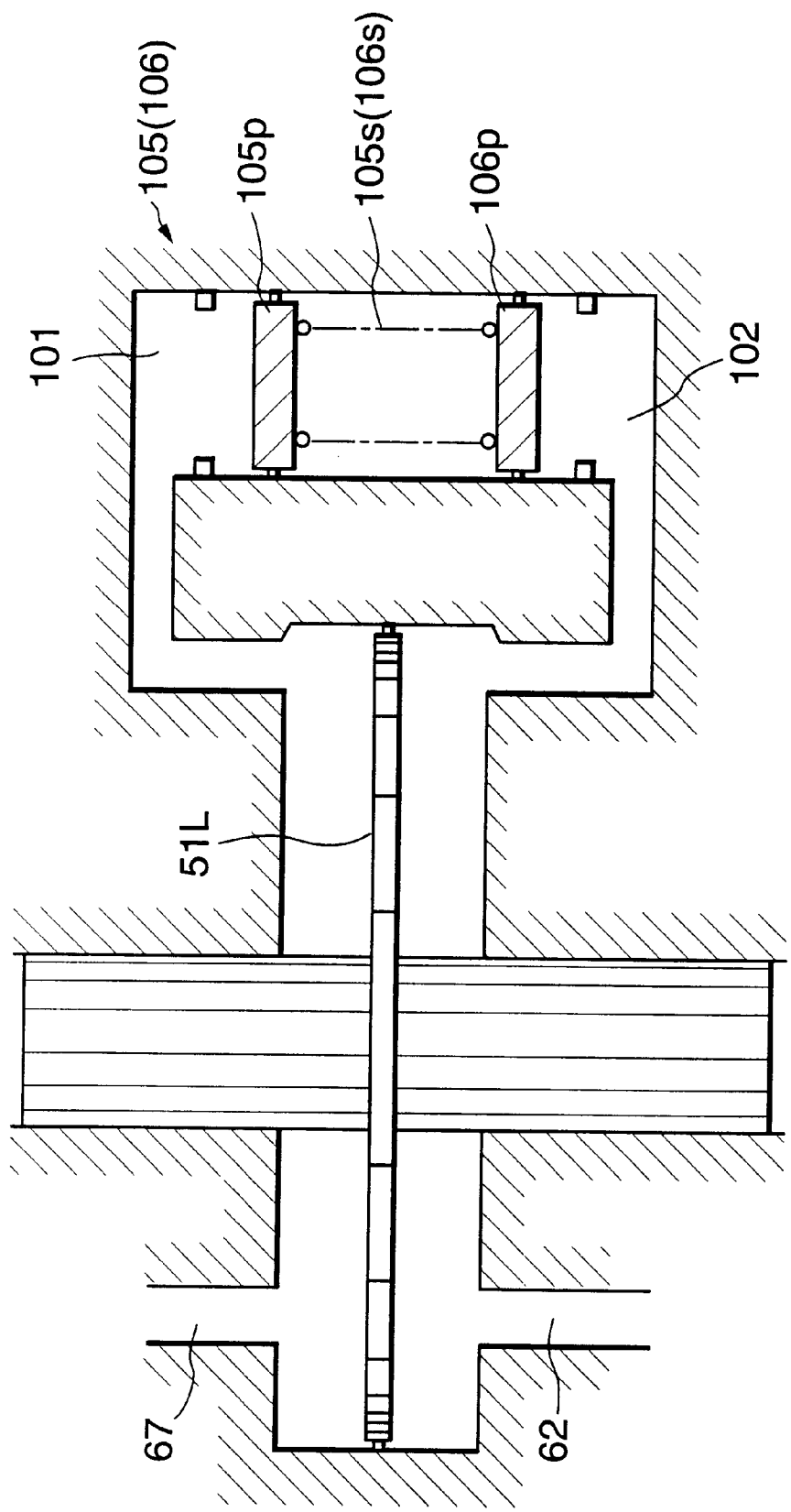
FIG. 16 is a hydraulic pressure circuit diagram of a servo piston according to a thirteenth embodiment of this invention.

FIG. 16 shows a thirteenth embodiment of this invention.

This embodiment is one in which the two accumulators 105 and 106 of the twelfth embodiment have been unified. It is possible to save yet more space by the employment of this construction.

Figure 17:
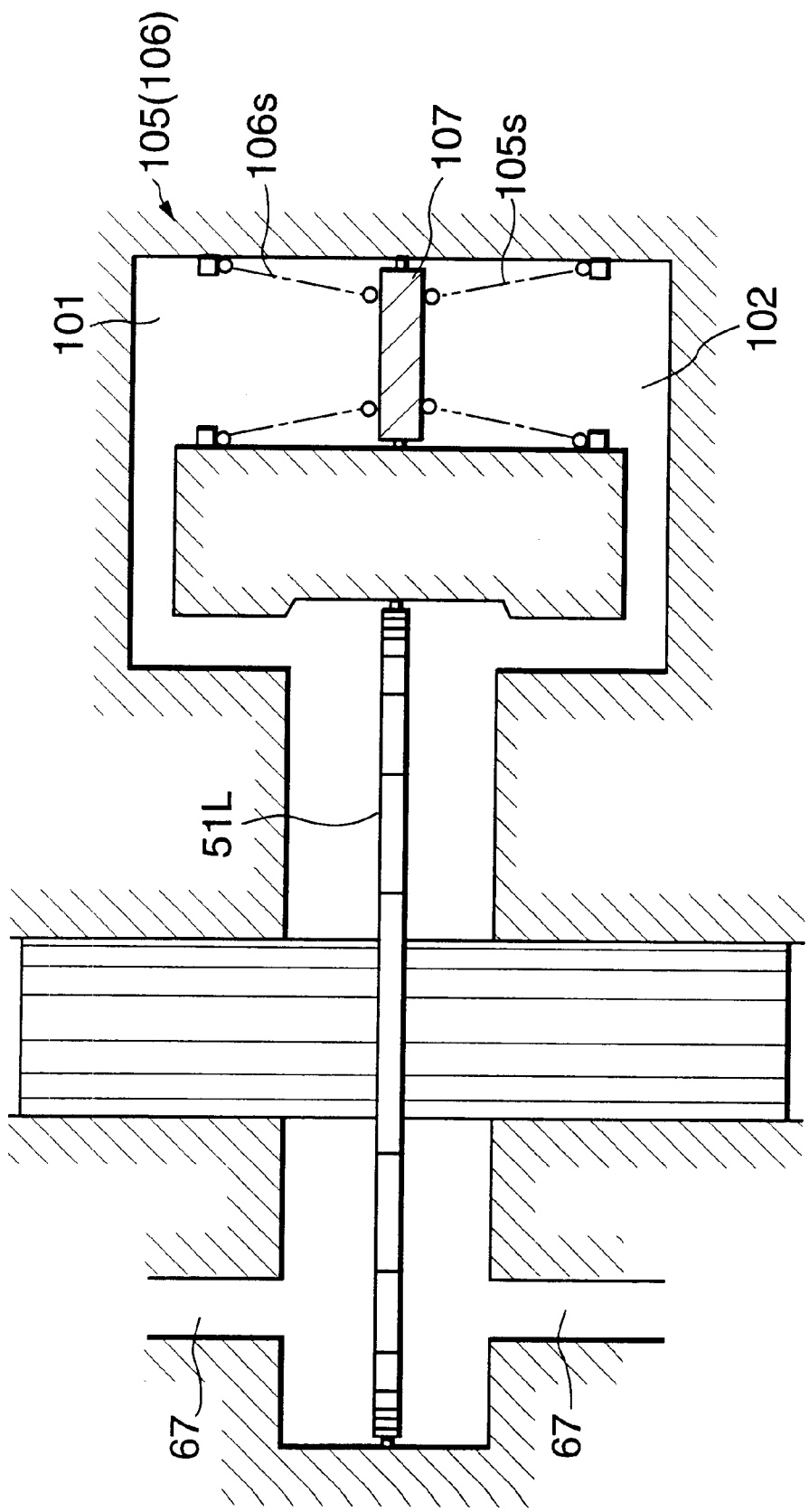
FIG. 17 is a hydraulic pressure circuit diagram of a servo piston according to a fourteenth embodiment of this invention.

FIG. 17 shows a fourteenth embodiment of this invention.

This embodiment is one in which the pistons 105P and 106P of the two accumulators 105 and 106 of the twelfth embodiment have been unified. According to this embodiment, the extension chambers 101 and 102 are defined by a piston 107 which is driven in response to the difference between the hydraulic pressures above and below the piston 51L. Yet further saving of space is made possible by this construction, and virtually no ineffective space is present.

Figure 18:
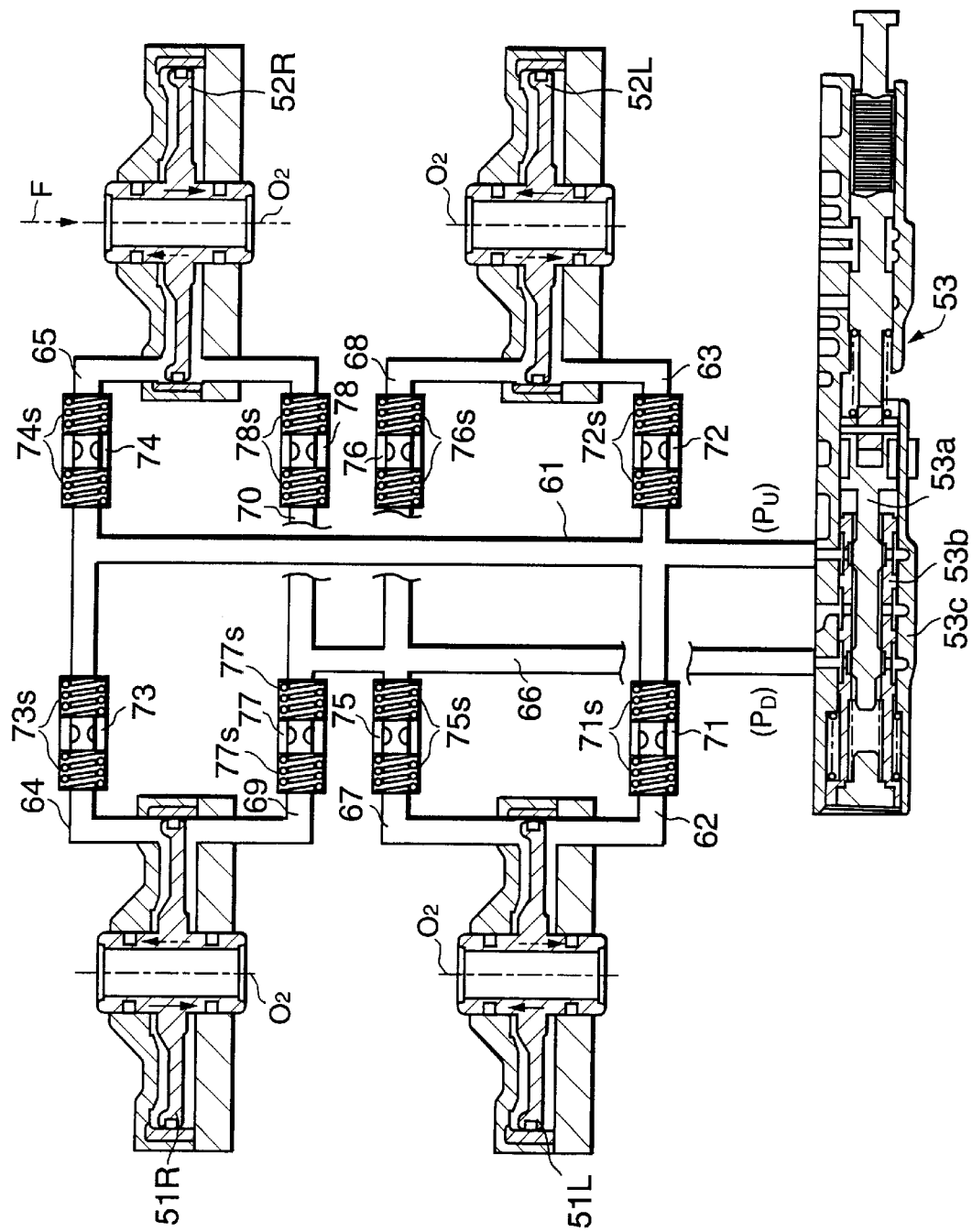
FIG. 18 is a hydraulic pressure circuit diagram of a servo piston according to a fifteenth embodiment of this invention.

FIG. 18 shows a fifteenth embodiment of this invention, which differs from the first embodiment in that each one of the damping orifices 71 through 78 is resiliently supported by a respective pair of springs 71S through 78S, so that it can be displaced along its corresponding one of the branch conduits 62 through 65 and 67 through 70.

For example, if as shown by the dashed arrow in the figure a force F due to external disturbance has been input to the piston 52R, the damping orifices 74 a nd 78 which are disposed in the branch conduits 65 and 70 are displaced in the direction of flow of the actuating hydraulic fluid. Because of this feature, the damping characteristics of this fifteenth embodiment are different from those of the first embodiment in which the damping orifices 74 and 78 were fixed.

In detail, along with the orifices 74 and 78 providing resistance in response to the speed of displacement of the piston 52R, the springs 74S and 78S generate counter force in response to the amount of stroke of the piston 52R. Due to this, it is possible yet more securely to prevent external disturbance spoiling the synchronization of the pistons.

Figure 19:
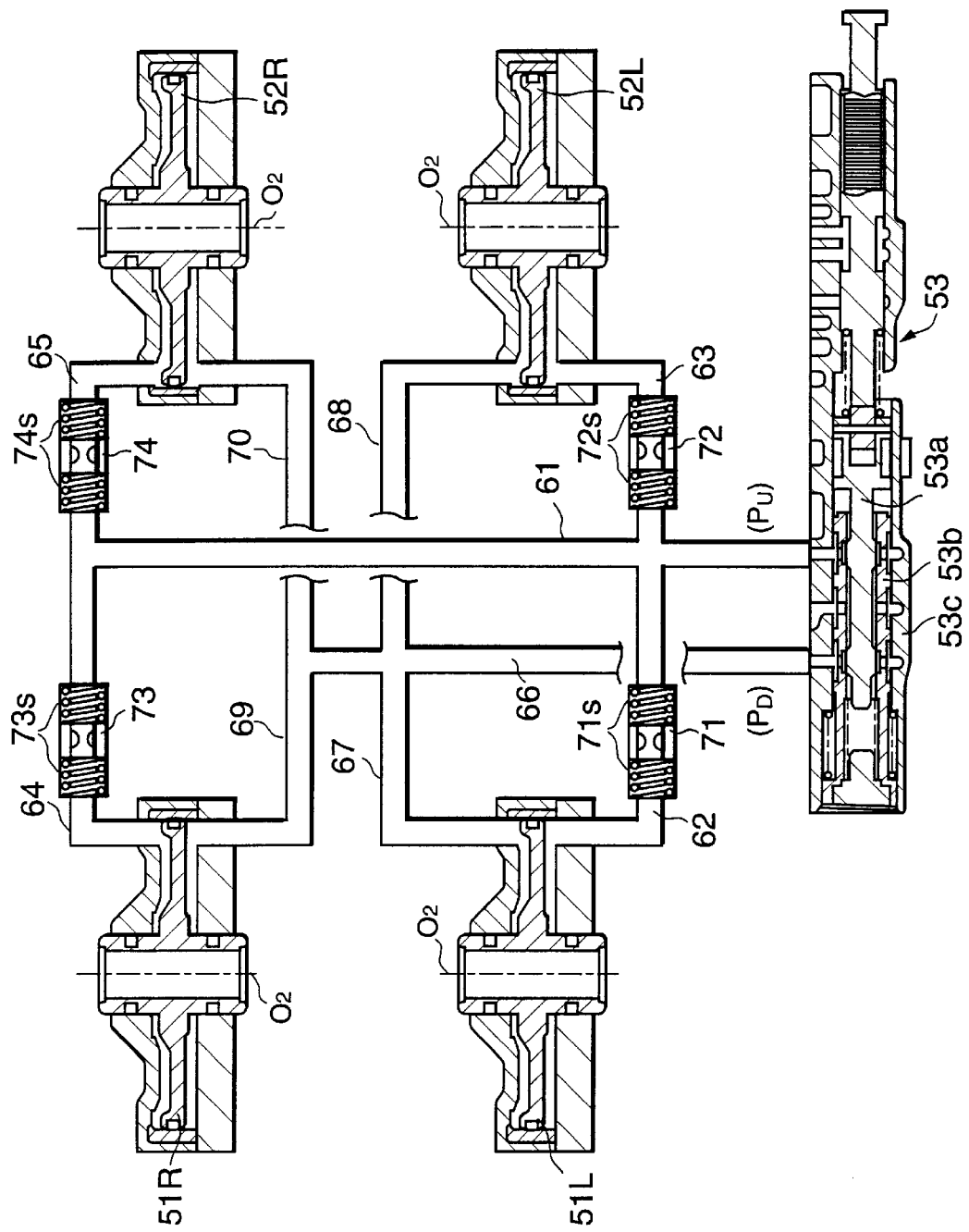
FIG. 19 is similar to FIG. 18, but showing a sixteenth embodiment of this invention.

FIG. 19 shows a sixteenth embodiment of this invention, in which damping orifices 71 through 74 which are elastically supported are provided to the branch conduits 62 through 65 for the upshift pressure Pu, while no damping orifices are provided to the branch conduits 67 through 70 for the downshift pressure Pd.

Figure 20:
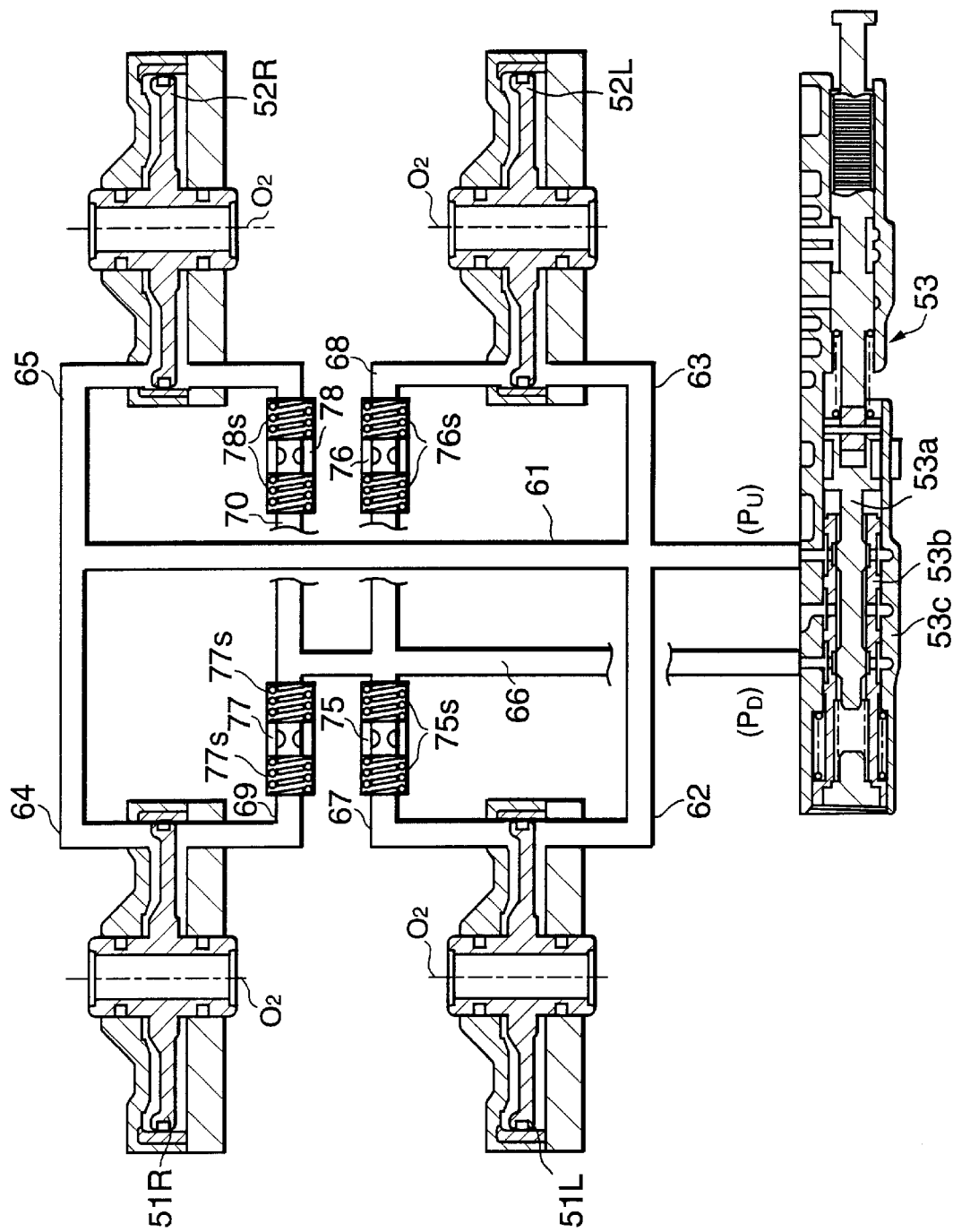
FIG. 20 is similar to FIG. 19, but showing a seventeenth embodiment of this invention.
Figure 23:
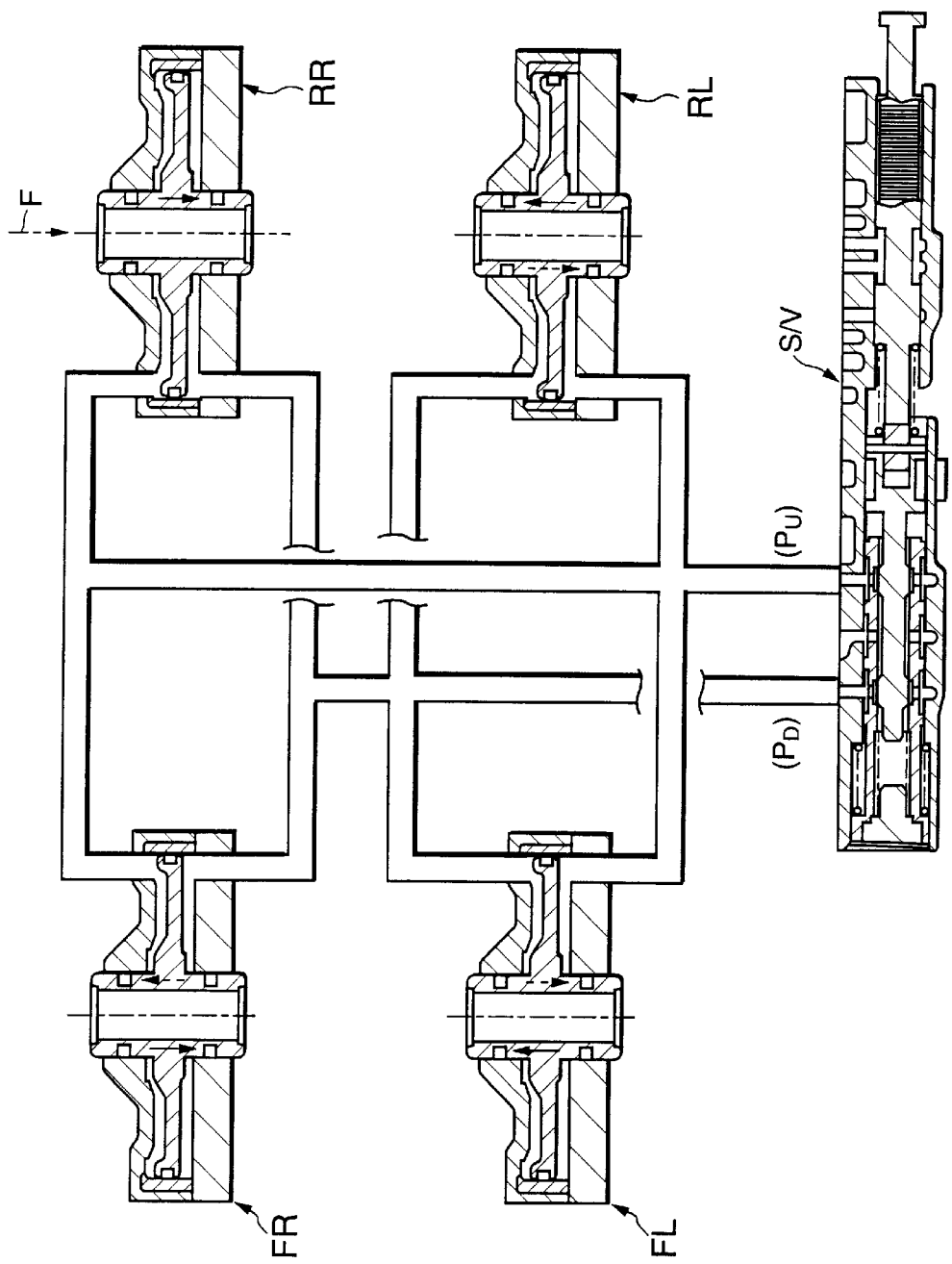
FIG. 23 is a hydraulic pressure circuit diagram according to a prior art toroidal type continuously variable transmission.

Similarly, FIG. 20 shows a seventeenth embodiment of this invention, in which damping orifices 75 through 78 which are elastically supported are provided to the branch conduits 67 through 70 for the downshift pressure Pd, while no damping orifices are provided to the branch conduits 62 through 65 for the upshift pressure Pu.

As described above, it is possible to obtain considerable effects even if damping orifices which are elastically supported are provided only in certain ones of the branch conduits. If this is done, it is possible to keep the reduction of the speed change responsiveness to the minimum, since the number of orifices and springs is reduced, and it is also possible to ensure the stability of the speed change control.

FIG. 21 shows an eighteenth embodiment of this invention in which a damping choke 71c is used instead of the damping orifice 71. This damping choke 71c is elastically supported at its both ends by coil springs 71S, and it is displaced along the branch conduit 62 according to the pressure difference across it. It would be possible to substitute the same type of damping chokes for the other damping orifices as well.

FIGS. 22A and 22B show a nineteenth and a twentieth embodiment of this invention which particularly relate to the springs which elastically support the damping orifice. Although it is desirable for the springs which support the orifice to be coil springs which use little dedicated space and are of low cost, it would also be possible to use plate springs.

In this case, as for example shown in FIG. 22A, at each end of the damping orifice 71, four plate springs 71Sd are superimposed in pairs so as to constitute two combined plate springs, which are then superimposed in opposition to one another.

Or, as shown in FIG. 22B, it would be possible for the four plate springs to be superimposed facing alternately in opposite directions.

The embodiments of this invention in which an exclusive property or privilege is claimed are defined as follows:

1. A toroidal continuously variable transmission comprising:
    first and second toroidal speed change units disposed coaxially upon a main shaft, the first toroidal speed change unit having first and second power rollers sandwiched between a first input cone disk and a first output cone disk, which first disks are collinearly arranged, and the second toroidal speed change unit having third and fourth power rollers sandwiched between a second input cone disk and a second output cone disk, which second disks are collinearly arranged, the first and second input and output cone disks being collinear on a same axis of rotation;
    a first piston that drives the first power roller in a direction perpendicular to the rotation axis to change a gyration angle thereof;
    a second piston that drives the second power roller in a direction perpendicular to the rotation axis to change a gyration angle thereof;
    a third piston that drives the third power roller in a direction perpendicular to the rotation axis to change a gyration angle thereof;
    a fourth piston that drives the fourth power roller in a direction perpendicular to the rotation axis to change a gyration angle thereof;
    first and second opposing hydraulic chambers sandwiching the first piston to drive the first piston in mutually opposite directions;
    third and fourth opposing hydraulic chambers sandwiching the third piston to drive the third piston in mutually opposite directions;
    at least one chamber that drives each of the second and fourth pistons;
    a speed change control valve that supplies hydraulic fluid to the hydraulic chambers of the first, second, third, and fourth pistons;
    hydraulic fluid conduits connecting the first, second, third, and fourth chambers, and the chambers for the second and fourth pistons to the speed change control valve, the hydraulic fluid conduits including first, second, third, and fourth fluid conduits communicating respectively with the first, second, third, and fourth hydraulic chambers, wherein the first and third chambers fluidly communicate with each other through the first and third fluid conduits, and the second and fourth chambers fluidly communicate with each other through the second and fourth fluid conduits; and
    a damping element comprising an orifice provided in one of the first and second fluid conduits, and one of the third and fourth fluid conduits to provide resistance to a stroke thereof in response to an external disturbance.

2. A toroidal continuously variable transmission according to claim 1, wherein the second piston is sandwiched between fifth and sixth opposing hydraulic chambers to drive the second piston in mutually opposite directions, and the fourth piston is sandwiched between seventh and eighth opposing hydraulic chambers to drive the fourth piston in mutually opposite directions, and wherein the hydraulic fluid conduits further include fifth, sixth, seventh, and eighth fluid conduits communicating respectively with the fifth, sixth, seventh, and eighth chambers, the first, third, sixth, and eighth chambers communicating with each other through the first, third, sixth, and eighth fluid conduits, and the second, fourth, fifth, and seventh chambers communicating with each other through the second, fourth, fifth, and seventh fluid conduits.

3. A toroidal continuously variable transmission according to claim 2, further including a damping element comprising an orifice provided in each of the hydraulic fluid conduits communicating with the second, fourth, fifth, and seventh hydraulic chambers.

4. A toroidal continuously variable transmission according to claim 2, wherein the fifth and seventh chambers fluidly communicate with each other through the fifth and seventh fluid conduits and the sixth and eighth chambers fluidly communicate with each other to synchronously drive the second and fourth pistons.

5. A toroidal type continuously variable transmission according to claim 2, further including a damping element comprising an orifice provided in each of the hydraulic fluid conduits communicating with the first, third, sixth, and eighth hydraulic chambers.

6. A toroidal continuously variable transmission according to claim 2, wherein the first, third, sixth, and eight chambers fluidly communicate with each other, and the second, fourth, fifth, and seventh chambers fluidly communicate with each other to synchronously drive the first, second, third, and fourth pistons.

7. A toroidal continuously variable transmission according to claim 6, wherein the orifices are elastically supported within the hydraulic fluid conduits and displaceable in a hydraulic fluid flow direction.

8. A toroidal continuously variable transmission according to claim 7, wherein each orifice is elastically supported by a coil spring.

9. A toroidal continuously variable transmission according to claim 7, wherein each orifice is elastically supported by a plate spring.

* * * * *